Figure 1:
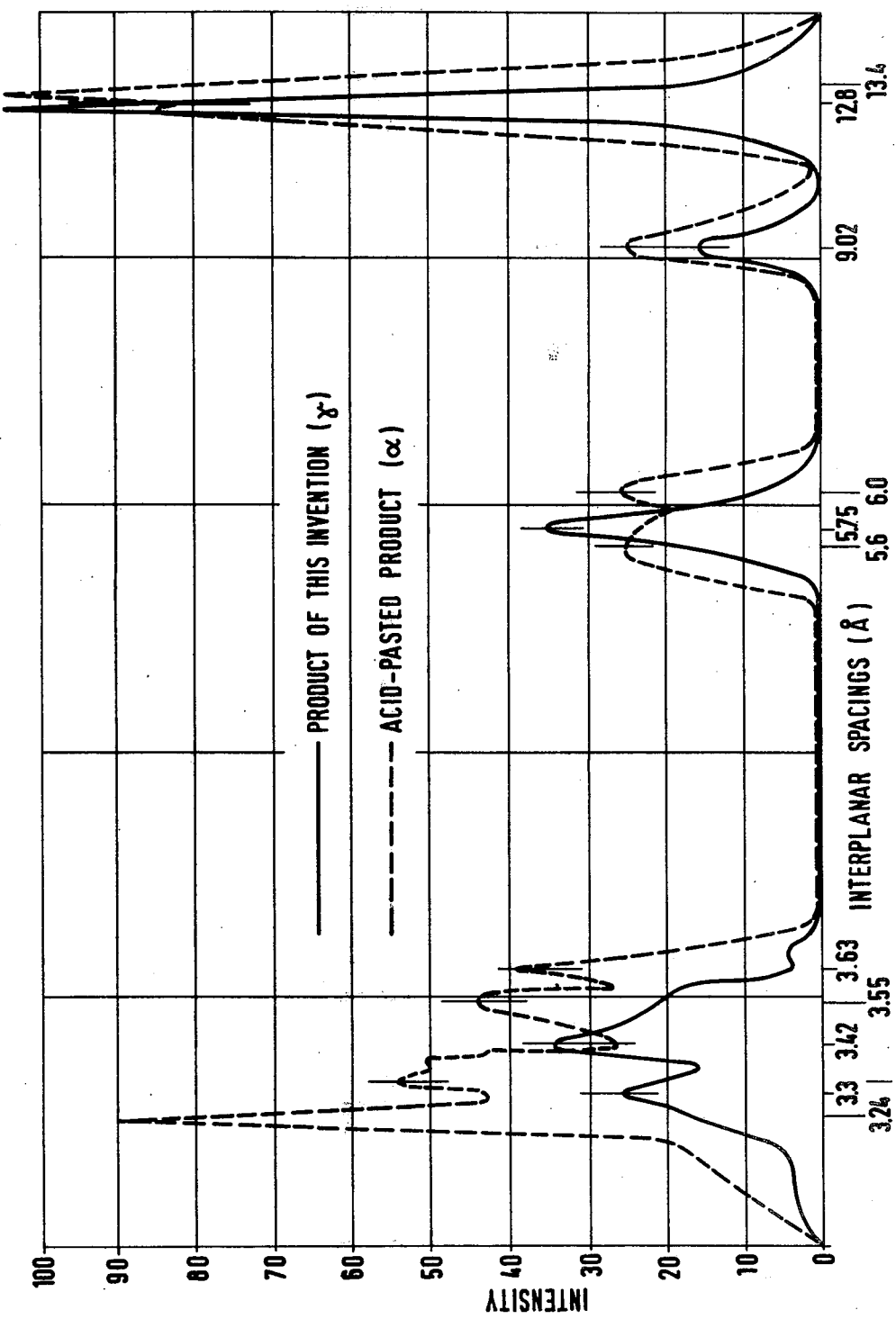

United States Patent [19]

Wheeler et al.

[11] 4,205,995
[45] Jun. 3, 1980

[54] PIGMENT COMPOSITIONS

[75] Inventors: Ian R. Wheeler, Houston; George H. Robertson, Paisley, both of Scotland

[73] Assignee: Ciba-Geigy Corporation, Ardsley, N.Y.

[21] Appl. No.: 854,865

[22] Filed: Nov. 25, 1977

[30] Foreign Application Priority Data

Dec. 1, 1976 [GB] United Kingdom ............... 50055/76

[51] Int. Cl.$^2$ .............................................. C08K 5/34
[52] U.S. Cl. ....................... 106/288 Q; 106/308 N; 106/309; 260/314.5
[58] Field of Search ............... 106/288 Q, 308 N, 309; 260/314.5

[56] References Cited

U.S. PATENT DOCUMENTS

| | | | |
|---|---|---|---|
| 3,891,455 | 6/1975 | Langley et al. | 106/288 Q |
| 4,039,346 | 8/1977 | Kranz | 106/288 Q |
| 4,055,440 | 10/1977 | Wheeler et al. | 106/288 Q |

FOREIGN PATENT DOCUMENTS 1263684 2/1972 United Kingdom ................ 106/288 Q

*Primary Examiner*—Delbert E. Gantz
*Assistant Examiner*—Jacqueline Howard
*Attorney, Agent, or Firm*—Joseph F. DiPrima

[57] ABSTRACT

A pigment composition comprising 80–99% weight/weight of copper phthalocyanine containing 1.5–10% weight/weight of peripherally-bound chlorine, and 20–1% weight/weight of a sulphonated copper phthalocyanine derivative having the formula:

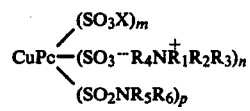

wherein CuPc represents a copper phthalocyanine residue, $R_1$, $R_2$, $R_3$, $R_4$, $R_5$ and $R_6$ are the same or different and each represents a hydrogen atom, an alkyl group having from 1 to 22 carbon atoms or a cyclic alkyl group having from 5 to 22 carbon atoms, an aryl, aralkyl, alkaryl or dehydroabietyl group, X represents hydrogen or an alkali metal atom and m, n and p can each be 0 or a value in the range of from 1 to 4, with the proviso that the sum of m, n and p is within the range of from 1 to 4; the composition being characterized by its x-ray diffraction spectrum as resembling the γ—crystal form, and further characterized by the substantial absence of any tendency to crystallize on prolonged contact with aromatic solvents, even at elevated temperatures, which composition, without further pigmentization stages, is suitable for direct incorporation in surface coating media, and provides excellent strength and flow properties therein.

7 Claims, 3 Drawing Figures

PIGMENT COMPOSITIONS

The present invention relates to pigment compositions, and in particular to solvent stable copper phthalocyanine pigment compositions having x-ray diffraction spectra, resembling the γ-crystal form of copper phthalocyanine, and processes for their preparation.

It is known that copper phthalocyanine may be obtained in five different crystal forms, α, β, γ, δ and ε. The particular modification in which copper phthalocyanine is produced is of great commercial significance because each modification differs greatly from the others in its properties, both physical and tinctorial. In relation to tinctorial properties, α-copper phthalocyanine exhibits red-shade blue pigmentations in surface coating binders, whereas the other commonly used copper phthalocyanine, the β-modification, exhibits green-shade blue pigmentations in such substrates. The γ- and δ-modifications exhibit shades falling between the α and β modifications, and the ε-form is the reddest known form of copper phthalocyanine.

The β-form is the most stable to crystal change in aromatic solvents and is therefore suitable for incorporation into surface coating media containing such solvents. The α-form, although unstable with respect to the β-form, may be stabilised against conversion to the β-form in aromatic solvents by, for example, incorporating halogen into the phthalocyanine molecule. Thus both the α- and β-forms, when reduced to finely divided particles, are used commercially as pigments. In contrast, the γ, δ and ε forms tend to be unstable in aromatic solvents and therefore find little commercial use as pigments.

The various crystal forms may be distinguished from each other and from mixtures of two or more forms by their x-ray diffraction spectra. The x-ray diffraction spectra of the α- and β-forms of copper phthalocyanine are described in U.S. Pat. No. 2,486,351 and those of the δ- and ε-forms in British Pat. No. 912,526 and German Pat No. 1,181,248, respectively.

In U.S. Pat. No. 2,770,629, there is described the x-ray diffraction spectrum of γ-form copper phthalocyanine and a method for the preparation of the latter, comprising stirring crude β-form copper phthalocyanine, at ambient temperature, with 40–60% aqueous sulphuric acid for 3 hours in the presence of xylene sulphonic acid; thereafter pouring the reaction mixture into a bulk of water, stirring with dilute sodium carbonate solution and recovering γ-form copper phthalocyanine by filtration, washing with water and drying.

Japanese Pat. No. 69,1708, discloses the preparation of γ-form copper phthalocyanine by treatment of copper phthalocyanine with 50–65% aqueous sulphuric acid at an elevated temperature to form copper phthalocyanine mono sulphate and subsequent hydrolysis with a base such as sodium hydroxide. A method of preparation of phthalocyanine salts capable of yielding flocculation resistant γ-form phthalocyanine is also described and claimed in U.S. Pat. No. 2,524,672.

Novel phthalocyanine compounds characterised by their x-ray diffraction spectra, high surface areas, and stability to organic solvents are described and claimed in U.S. Pat. No. 2,910,482. The process for their preparation comprises reacting micropulverised anhydrous cupric chloride with urea, phthalic anhydride, and a monochloro phthalic compound at an elevated temperature in an inert oganic liquid in the presence of a reaction catalyst, under vigorous agitation and recovering the product by conventional means.

Disadvantages of this process include the high cost of the monochlorophthalic compound, the necessity to use large amounts of urea, resulting in low throughput and therefore an increase in cost, the need to micropulverize the cupric chloride and the requirement for violent agitation In contrast to the foregoing, we have found, surprisingly, that copper phthalocyanine in a form resembling the pure or substantially pure γ-crystal form, may be obtained by the addition of specific copper phthalocyanine derivatives to the synthesis of copper phthalocyanine by the so-called "phthalic anhydride-urea process" in the presence of a small amount of one or more halogenated phthalic acid derivatives. The use of large amounts of halogenated phthalic acid derivatives, and urea and high shear is thus avoided.

Accordingly, the present invention provides a pigment composition comprising 80–99% w/w of copper phthalocyanine containing 1.5–10% w/w of peripherally bound chlorine, and 20–1%, w/w of a sulphonated copper phthalocyanine derivative having the formula:

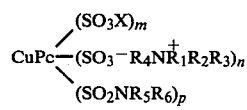

wherein CuPc represents a copper phthalocyanine residue, $R_1$, $R_2$, $R_3$, $R_4$, $R_5$ and $R_6$ are the same or different and each represents a hydrogen atom, an alkyl group having from 1 to 22 carbon atoms or a cyclic alkyl group having from 5 to 22 carbon atoms, an aryl, aralkyl, alkaryl or dehydroabietyl group, X represents hydrogen or an alkali metal atom and n, m and p can each be 0 or a value in the range of from 1 to 4, with the proviso that the sum of n, m and p is within the range of from 1 to 4; the composition being characterised by its x-ray diffraction spectrum as resembling the γ-crystal form, and further characterised by the substantial absence of any tendency to crystallise on prolonged contact with aromatic solvents, even at elevated temperatures.

This pigment composition, without further pigmentization stages, is suitable for direct incorporation in surface coating media, and provides excellent strength and flow properties therein.

The invention also provides a process for the preparation of said pigment composition, comprising reacting, in a substituted aromatic hydrocarbon solvent boiling above 160° C., at 160°–220° C. for 3–20 hours, a mixture of a phthalic compound, a mono-halogenated phthalic compound, a nitrogen source, an anhydrous copper salt, a reaction catalyst as conventionally used in phthalocyanine synthesis, and from 1 to 20% weight/weight of a sulphonated copper phthalocyanine derivative of formula I; and recovering the pigment composition by separation from the solvent by conventional techniques. As a further aspect, there is provided the γ-modification of copper phthalocyanine when produced by this process.

In a further aspect, the present invention also provides a pigment composition comprising the γ-modification of copper phthalocyanine and a compound of formula I, as hereinbefore defined, or a derivative thereof, for example a derivative of the compound of formula I as present in the product of the process of the present invention.

In relation to the compounds of formula I, the alkyl, cycloalkyl, aryl, aralkyl or alkaryl substituent groups $R_1$–$R_6$ may be unsubstituted or may be substituted by hydroxyl, amino, alkylamino, alkoxy or amide groups.

Due to the method preparation of such compounds, namely by reaction of copper phthalocyanine with oleum or chlorosulphonic acid, optionally followed by thionyl chloride, and subsequent treatment with an amine or mixture of amines, mixtures of compounds of formula I having varying degrees of substitution are produced. Analysis of such mixtures therefore can establish fractional values for m, n and p. Suitable compounds of formula I are those wherein m has a value in the range 0 to 2 and p and n each have a value in the range 0 to 3, subject to the provisos described hereinbefore.

Copper phthalocyanine pigments which are in the form of pure γ-modification, or which resemble this modification, may be differentiated from other known modifications and from mixtures with these various modifications, not only by shade but especially by means of x-ray diffraction spectra. The spectrum of the γ-form, shown in the attached FIG. 1, is reproduced from U.S. Pat. No. 2,910,482 wherein the γ-form of chlorine-containing copper phthalocyanine was first described.

Suitable phthalic compounds capable of forming the phthalocyanine ring system are, for example, phthalamic acid, phthalimide, phthalic acid, phthalic anhydride and 0-cyano benzoic acid, though phthalic acid or anhydride are preferred. 4-chloro-phthalic acid is the preferred mono-halogenated phthalic compound.

Among copper salts capable of providing the central copper atom of the copper phthalocyanine molecule, there may be mentioned anhydrous cupric sulphate, anhydrous cupric acetate and anhydrous cuprous chloride but anhydrous cupric chloride is preferred. To ensure a high yield of the desired copper phthalocyanine, 0.90–1.10 moles of copper salt for every 4 moles of the phthalic phthalocyanine ring-forming compound has been found satisfactory.

While ammonia and biauret may be mentioned, urea is preferred as a source of nitrogen on account of its low cost and commercial availability. A satisfactory level of urea is 15–20 moles for every 4 moles of the phthalic phthalocyanine ring-forming compound.

Catalysts suitable for the operation of the process are those previously described in the literature as suitable for phthalocyanine synthesis. Compounds of molybdenum, especially ammonium molybdate or molybdic oxide are preferred as they have been found to give high yields of copper phthalocyanine. A concentration of 0.01–0.03 moles for every 4 moles of the phthalocyanine ring-forming compound is generally suitable.

Suitable solvents are those boiling above 150° C. e.g. substituted aromatic hydrocarbons such as nitrotoluene, but nitrobenzene is particularly preferred.

Although the quantity of solvent employed in the reaction is not critical, it is usual to use only sufficient organic solvent to ensure a stirrable reaction mass; too much solvent is wasteful and tends to reduce the rate of reaction. A level of 1.5–3 moles per 4 moles of phthalocyanine ring-forming compound is generally found satisfactory.

A level of 1%–20% w/w of the compound of formula I, based on copper phthalocyanine, has been found satisfactory, though 5–15% w/w is preferred. Too low a level may give ris to appreciable quantities of undesirable crystal modifications, whilst too high a level is wasteful of additive and is moreover expensive and reduces the colour strength of the product.

The process of the invention may be carried out in any stirred vessel commonly employed for the preparation of phthalocyanines and capable of operation at temperatures from 25° to 220° C. It is found convenient to charge all reagents cold to the vessel. With stirring, the temperature is raised cautiously through 100° C., where evolution of volatile material takes place, to 170°–180° C. At such a temperature reaction is essentially complete in 6–10 hours, though the yield may be maximised by reacting for up to 18 hours. Alternatively, the reaction may be carried out at higher temperatures for shorter times. A temperature of 200° C. for 3½ hours has been found satisfactory, giving high yields of copper phthalocyanine. Although the crystal modifying additive is conveniently added at the start of the reaction, it may be added at any time during the heating stage at which the temperature of the reaction is less than 120° C.

The γ-form copper phthalocyanine product may be separated from the reaction mixture by any of the methods previously known; for example by removal of the solvent by filtration and drying but preferably by steam distillation under alkaline conditions followed by hot filtration and washing with hot water. If desired, further by-products of the reaction may be removed, by stirring the presscake so obtained in hot aqueous mineral acid, filtering hot, washing with hot water and drying at 50°–55° C.

Alternatively the pigment product may be recovered by dilution by an oxygen containing solvent such as methanol, filtering and washing with further methanol and drying.

The γ-form copper phthalocyanine pigments obtained according to the present invention may, if appropriate, be optimised in their applicational properties by conventional techniques. Such techniques include short milling cycles in a ball-mill, solvent treatment e.g. in accordance with British Pat. No. 1,140,836, or the addition of rosin or an aliphatic amine having from 12 to 22 carbon atoms.

A still further aspect of the present invention concerns a composition comprising an organic material and a pigmenting proportion of a pigment composition according to the present invention; and also a method of pigmenting organic material comprising incorporating therein a pigmenting proportion of the pigment composition of the invention.

The proportion of the pigment composition in the organic material is normally within the range from 0.1% to 20% by weight, based on the weight of the organic material.

Organic materials which may be coloured according to the invention include high molecular weight organic material, e.g. cellulose ethers and cellulose esters such as ethyl cellulose, acetylcellulose and nitrocellulose, polyamides, polyurethanes and polyesters, natural and synthetic resins such as aminoplasts, especially urea-formaldehyde and melamine-formaldehyde resins, alkyd resins, phenoplasts, polycarbonates, polyolefins such as polystyrene, polyvinyl chloride, polyethylene, polypropylene, polyacrylonitrile, polyacrylic acid esters, rubber, casein, silicone and silicone resins, individually or in admixture. It does not matter whether these high molecular weight compounds are in the form of plastic masses or melts or solutions or dispersions in the form of spinning solutions.

The pigment compositions of the invention are of particular interest however for the colouration of lacquers, paints and printing inks, especially solvent-based decorative and industrial paints and packaging inks.

The pigment compositions of the invention are characterized by shade intermediate of α- and β-forms, excellent strength, flow and solvent stability.

A further advantage of this invention is that, in the products of the process of the invention, the compound of formula I or a derivative formed in the reaction may be retained in the pigment composition, whereby it appears to improve the rheological and colouristic properties of the pigment composition in application.

The following Examples further illustrate the present invention.

EXAMPLE 1

82 parts phthalic anhydride, 24 parts 4-chloro phthalic acid, 22.5 parts anhydrous cupric chloride, 175 parts urea, 0.76 parts molybdic oxide, 300 parts nitrobenzene and 10 parts of the compound of average formula:

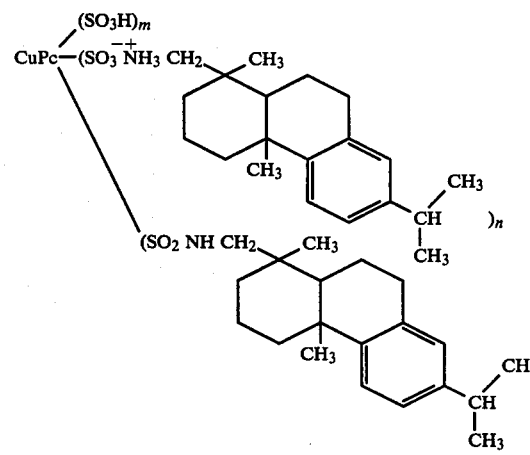

wherein $m=0.5$, and $n+P=2$, were stirred together in a vessel fitted with an air condenser. With stirring, the temperature was raised to 170° C. over 5 hrs, with a slow heating stage of 2½ hrs. between 95° C. and 110° C. to allow the smooth evolution of volatile material.

The temperature was maintained at 170° C., with stirring, for 16 hrs. after which the reaction mixture was discharged into a second vessel containing 35 parts of potassium hydroxide in 235 parts water. The nitrobenzene was removed by steam distillation and the residue filtered hot, and washed with hot water.

The presscake so obtained was reslurried in a solution of 100 parts concentrated hydrochloric acid in 500 parts water, stirred for 2 hrs at 95° C., then filtered hot, washed acid free with hot water, and dried in an oven at 55° C.

Figure 2:
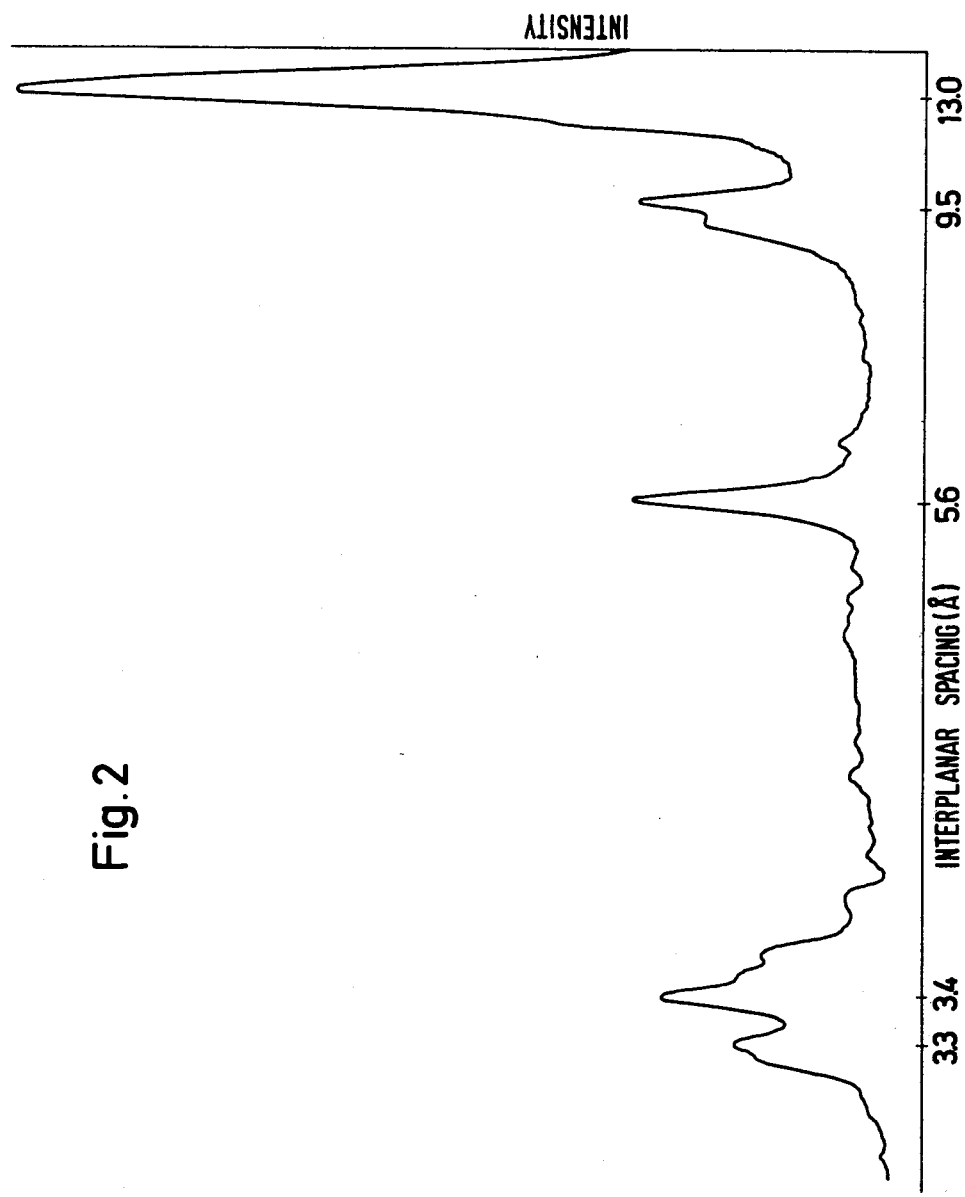

There were obtained 106 parts of a pigment composition having an X-ray diffraction spectrum (FIG. 2) corresponding to that characterising the γ-crystal form, and, typically, a particle size, calculated from electron micrographs, of less than 0.1μ.

The crystal modification of the pigment composition, as denoted by its X-ray spectrum, was unchanged by refluxing the pigment composition for 2 hrs in fifty times its own weight of toluene: neither could any evidence of crystal growth be detected as a result of such treatment.

The pigment composition of this example, without any conditioning treatment to further reduce its particle size, was incorporated in an alkyd-melamine paint medium by ballmilling. When sprayed onto a metal panel, the paint film was of similar strength but of a redder shade than a similar paint film derived from a β-form copper phthalocyanine, conditioned by salt milling and solvent treatment.

If the synthesis stage of this Example is repeated in the absence of the sulphonated phthalocyanine derivative, a copper phthalocyanine having a particle size of 20–40μ and an X-ray spectrum similar to that of the β-modification, is obtained. If both the sulphonated phthalocyanine derivative and the 4-chloro phthalic acid are omitted from the synthesis, there is obtained a copper phthalocyanine of the β-modification, having a particle size of 50–60μ.

EXAMPLE 2

Figure 3:
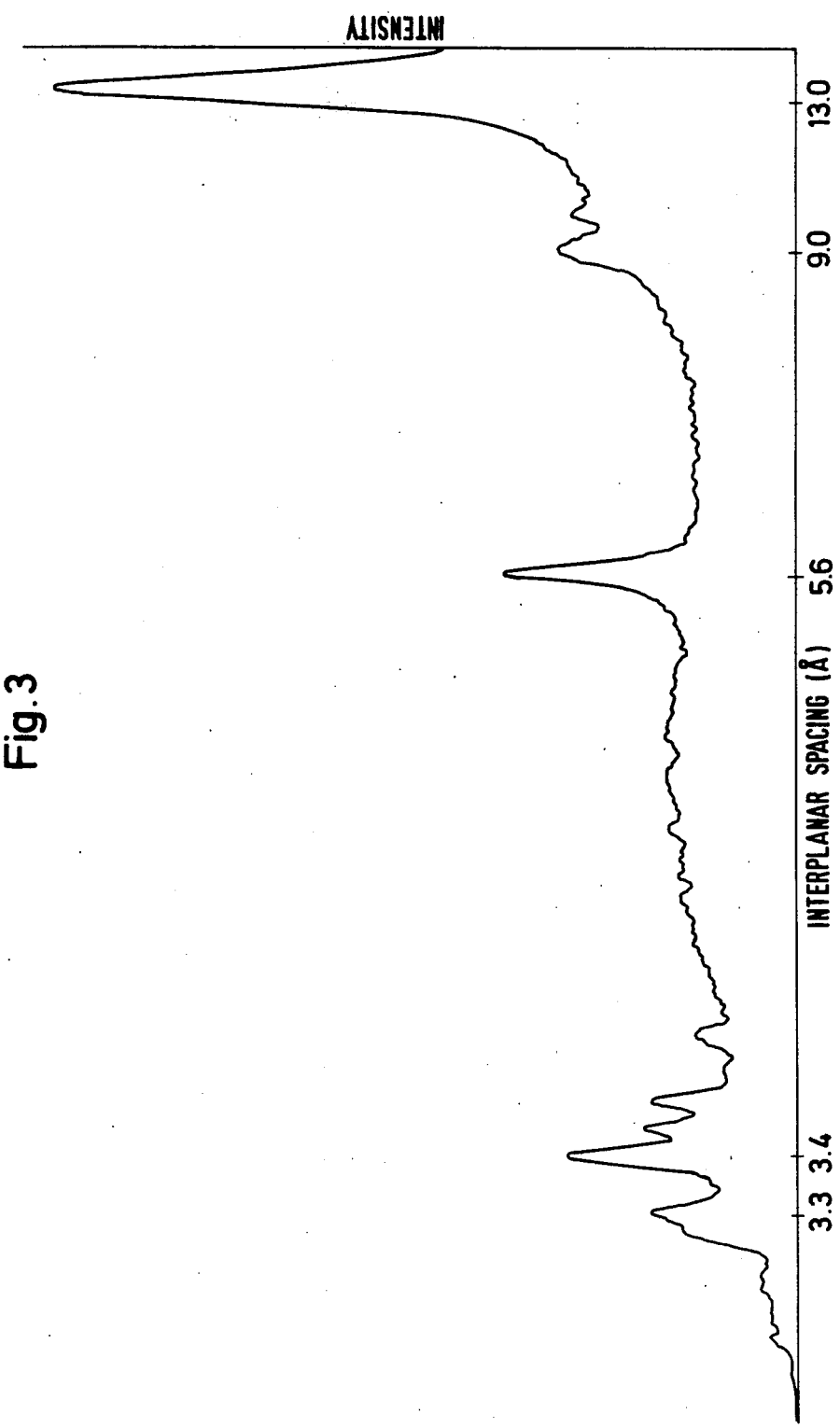

82 parts phthalic anhydride, 24 parts 4-chloro phthalic acid, 22.5 parts anhydrous cupric chloride, 175 parts urea, 0.76 parts molybdic oxide, 250 parts nitrobenzene and 9.5 parts of the compound of average formula:

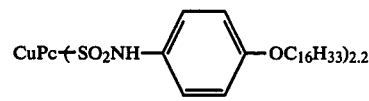

were stirred together. Using the method of Example 1, the mixture was reacted and the product recovered and purified to give 96 parts of a pigment composition having a X-ray spectrum (FIG. 3) corresponding to that characterising the γ-crystal form.

What we claim is:

1. A process for the preparation of a pigment composition, which has an X-ray diffraction spectrum resembling the γ-crystal form and does not crystallize on prolonged contact with aromatic solvents, said composition comprising 80–99% by weight of copper phthalocyanine containing 1.5–10% by weight of a sulphonated copper phthalocyanine derivative having the formula:

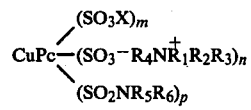

wherein CuPc represents a copper phthalocyannine residue, $R_1$, $R_2$, $R_3$, $R_4$, $R_5$ and $R_6$ are independently a hydrogen atom, an alkyl group having from 1 to 22 carbon atoms or a cyclic alkyl group havig from 5 to 22 carbon atoms, an aryl, aralkyl, alkaryl or dehydroabietyl group, X represents hydrogen or an alkali metal atom and m, n and p can each be 0 or a value in the range of from 1 to 4, with the proviso that the sum of m, n and p is within the range of from 1 to 4, said process comprising reacting in a substituted aromatic hydrocarbon solvent, at a temperature in the range of from 160° and 220° C., over a period of 3 to 20 hours, a mixture of a phthalic compound, a mono-chlorinated phthalic compound, a nitrogen source, an anhydrous copper salt, a reaction catalyst and from 1 to 20% weight/weight of a sulphonated copper phthalocyanine derivative of formula I; and recovering the pigment composition by separating it from the solvent.

2. A process as claimed in claim 1 wherein the phthalic compound is phthalic acid or anhydride.

3. A process as claimed in claim 1 wherein the monohalogenated phthalic compound is 4-chlorophthalic acid.

4. A process as claimed in claim 1 wherein the nitrogen source is urea.

5. A process as claimed in claim 1 wherein the reaction catalyst is a compound of molybdenum.

6. A composition comprising an organic material and a pigmenting proportion of a pigment composition as defined in claim 1.

7. A composition as claimed in claim 6 wherein the organic material is a lacquer, paint or printing ink.